US011518607B2

(12) United States Patent
Jarisch et al.

(10) Patent No.: US 11,518,607 B2
(45) Date of Patent: *Dec. 6, 2022

(54) CAPSULE, SYSTEM AND METHOD FOR PREPARING A BEVERAGE BY CENTRIFUGATION

(71) Applicant: Société des Produits Nestlé S.A., Vevey (CH)

(72) Inventors: Christian Jarisch, Lutry (CH); Alexandre Perentes, Lausanne (CH); Stefan Kaeser, Aarau (CH); Carlo Magri, Monthey (CH); Arnaud Gerbaulet, Oye et Pallet (FR); Thomas Kaeser, Brent (CH); Daniel Abegglen, Rances (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/017,136

(22) Filed: Sep. 10, 2020

(65) Prior Publication Data

US 2021/0002065 A1    Jan. 7, 2021

Related U.S. Application Data (63) Continuation of application No. 13/697,297, filed as application No. PCT/EP2011/057657 on May 12, 2011, now Pat. No. 10,800,600.

(30) Foreign Application Priority Data

May 12, 2010 (EP) ..................................... 10162741
Jul. 13, 2010 (EP) ..................................... 10169374

(51) Int. Cl.
*B65D 85/804* (2006.01)
*A47J 31/22* (2006.01)
(Continued)

(52) U.S. Cl.
CPC ............ *B65D 85/8058* (2020.05); *A23L 2/38* (2013.01); *A47J 31/22* (2013.01); *A47J 31/4492* (2013.01);
(Continued)

(58) Field of Classification Search
CPC ... A47J 31/4492; A47J 31/22; B65D 85/8043; B65D 22/205; B65D 2203/06; G06K 19/00; G06K 19/06018; G06K 19/0614
See application file for complete search history.

(56) References Cited

U.S. PATENT DOCUMENTS 2,451,195 A   10/1948  Brown
2,603,927 A    7/1952  Grey
(Continued)

FOREIGN PATENT DOCUMENTS

CA    2625310    9/2008
CN    2938096    8/2007
(Continued)

OTHER PUBLICATIONS

Non-Final Office Action for U.S. Appl. No. 16/517,054 dated Nov. 13, 2019.
(Continued)

*Primary Examiner* — Viren A Thakur
*Assistant Examiner* — Chaim A Smith
(74) *Attorney, Agent, or Firm* — K&L Gates LLP (57) ABSTRACT

Capsule for the preparation of a beverage comprising a container and a beverage ingredient contained therein, wherein the container comprises a code adapted for being identified or read by external reading means, wherein the code is arranged on the container to be read while the capsule is rotated around an axis of rotation traversing the capsule.

14 Claims, 4 Drawing Sheets

(51) Int. Cl.
  *A47J 31/44* (2006.01)
  *A23L 2/38* (2021.01)
  *G06K 19/00* (2006.01)
  *B65D 25/20* (2006.01)
  *G06K 19/06* (2006.01)

(52) U.S. Cl.
  CPC ....... *B65D 25/205* (2013.01); *B65D 85/8043* (2013.01); *G06K 19/00* (2013.01); *G06K 19/0614* (2013.01); *G06K 19/06018* (2013.01); *B65D 2203/06* (2013.01); *Y02W 90/10* (2015.05)

(56) References Cited

U.S. PATENT DOCUMENTS

| | | |
|---|---|---|
| 3,501,896 A | 3/1970 | Von Stoeser et al. |
| 4,136,202 A | 1/1979 | Favre |
| 5,004,913 A | 4/1991 | Kleinerman |
| 5,094,153 A | 3/1992 | Helbling |
| 5,103,081 A | 4/1992 | Fisher |
| 5,243,164 A | 9/1993 | Erickson et al. |
| 5,260,556 A | 11/1993 | Lake et al. |
| 5,273,392 A | 12/1993 | Bernard, II et al. |
| 5,285,041 A | 2/1994 | Wright |
| 5,392,102 A | 2/1995 | Toyoizumi et al. |
| 5,520,278 A | 5/1996 | Hughes |
| 5,974,950 A | 11/1999 | King |
| 6,081,326 A | 6/2000 | Rousseau et al. |
| 6,117,471 A | 9/2000 | King |
| 6,155,322 A | 12/2000 | Landan et al. |
| 6,253,820 B1 | 7/2001 | Landan et al. |
| 6,527,181 B1 | 3/2003 | Kleeberg et al. |
| 6,655,260 B2 | 12/2003 | Lazaris et al. |
| 6,698,333 B2 | 3/2004 | Halliday et al. |
| 6,802,454 B1 | 10/2004 | McMurty et al. |
| 6,820,535 B2 | 11/2004 | Fischer |
| 6,985,119 B2 | 1/2006 | Forster et al. |
| 7,097,074 B2 | 8/2006 | Halliday et al. |
| 7,258,061 B2 | 8/2007 | Campbell et al. |
| 7,335,387 B2 | 2/2008 | Hayes et al. |
| 7,461,584 B2 | 12/2008 | Blanc et al. |
| 7,607,385 B2 | 10/2009 | Halliday et al. |
| 7,614,524 B2 | 11/2009 | Girad et al. |
| 7,673,558 B2 | 3/2010 | Panesar et al. |
| 2002/0014531 A1* | 2/2002 | Murphy ................ G06K 7/14 235/462.03 |
| 2002/0020659 A1 | 2/2002 | Sweeney et al. |
| 2002/0048621 A1 | 4/2002 | Boyd et al. |
| 2002/0048631 A1 | 4/2002 | Boyd et al. |
| 2002/0148356 A1 | 10/2002 | Lazaris et al. |
| 2003/0001016 A1 | 1/2003 | Fraier |
| 2004/0005384 A1 | 1/2004 | Cai |
| 2004/0089158 A1 | 5/2004 | Mahlich |
| 2004/0129145 A1 | 9/2004 | Halliday et al. |
| 2004/0191372 A1 | 9/2004 | Halliday et al. |
| 2005/0022674 A1 | 2/2005 | Campbell et al. |
| 2005/0029287 A1 | 2/2005 | Mobbs |
| 2005/0150391 A1 | 6/2005 | Schifferle |
| 2005/0249052 A1 | 11/2005 | Benedetti et al. |
| 2006/0239742 A1 | 10/2006 | Bateman et al. |
| 2007/0203587 A1 | 8/2007 | Erlandsson et al. |
| 2007/0209524 A1 | 9/2007 | Kim |
| 2007/0245901 A1 | 10/2007 | Blanc et al. |
| 2008/0148948 A1 | 1/2008 | Evers et al. |
| 2008/0068178 A1 | 3/2008 | Meyer |
| 2008/0081089 A1 | 4/2008 | Blanc |
| 2008/0105130 A1 | 5/2008 | Koeling et al. |
| 2008/0302251 A1 | 12/2008 | Rijskamp et al. |
| 2008/0309495 A1 | 12/2008 | Chrisholm |
| 2009/0205747 A1 | 8/2009 | Lillard, Jr. |
| 2009/0324791 A1 | 12/2009 | Ohresser et al. |
| 2010/0000960 A1 | 1/2010 | Anderson |
| 2010/0071562 A1 | 3/2010 | Brezovnik et al. |
| 2010/0078480 A1 | 4/2010 | Aker |
| 2011/0315711 A1 | 12/2011 | Hecht et al. |
| 2013/0064937 A1 | 3/2013 | Jarisch et al. |
| 2013/0098940 A1 | 4/2013 | Bem et al. |
| 2014/0134299 A1 | 5/2014 | Guidorzi et al. |
| 2016/0280454 A1 | 9/2016 | Mills et al. |

FOREIGN PATENT DOCUMENTS

| | | |
|---|---|---|
| DE | 3432339 | 3/1986 |
| DE | 8612623 | 8/1986 |
| DE | 4421910 | 1/1996 |
| DE | 19910226 | 9/2000 |
| EP | 0339807 | 11/1989 |
| EP | 0455337 | 3/1991 |
| EP | 0449533 | 10/1991 |
| EP | 0455337 | 11/1991 |
| EP | 569230 B1 | 11/1993 |
| EP | 0455337 A1 | 6/1994 |
| EP | 0638486 | 10/1996 |
| EP | 0638486 B1 | 10/1996 |
| EP | 0868295 | 7/1999 |
| EP | 0765821 | 2/2000 |
| EP | 1344722 A1 | 9/2003 |
| EP | 1593329 | 5/2004 |
| EP | 1440638 | 7/2004 |
| EP | 1586534 | 10/2005 |
| EP | 1440644 | 4/2006 |
| EP | 1 764 015 | 3/2007 |
| EP | 1764015 | 3/2007 |
| EP | 1722398 A1 | 4/2007 |
| EP | 1772398 | 4/2007 |
| EP | 1849718 | 10/2007 |
| EP | 1849718 A1 | 10/2007 |
| EP | 1772398 | 11/2007 |
| EP | 1867261 | 12/2007 |
| EP | 1890271 | 2/2008 |
| EP | 2128802 | 5/2008 |
| EP | 1950150 | 3/2010 |
| EP | 1944264 | 4/2010 |
| EP | 1637457 | 9/2011 |
| EP | 1781151 | 1/2012 |
| EP | 2012994 B1 | 7/2012 |
| EP | 2341804 | 10/2012 |
| EP | 2427066 | 11/2012 |
| EP | 2384133 | 3/2013 |
| EP | 2525691 | 4/2014 |
| EP | 2470430 | 7/2014 |
| EP | 2512956 | 11/2014 |
| EP | 2528485 | 7/2015 |
| EP | 2493357 | 9/2015 |
| EP | 2957525 A1 | 12/2015 |
| EP | 2349176 | 3/2016 |
| EP | 2299851 | 8/2018 |
| FR | 2912124 | 8/2008 |
| GB | 2022059 | 12/1979 |
| GB | 2259078 | 3/1993 |
| GB | 2399404 | 9/2004 |
| GB | 2451508 | 2/2009 |
| JP | 6248878 | 10/1987 |
| JP | 6423936 | 1/1989 |
| JP | 233688 | 9/1989 |
| JP | 02180073 | 8/1990 |
| JP | 0818680 | 12/1991 |
| JP | 03297728 | 12/1991 |
| JP | H0540112 | 5/1993 |
| JP | 07125750 | 5/1995 |
| JP | 2756921 | 3/1996 |
| JP | 0977125 | 3/1997 |
| JP | 11120445 | 3/1997 |
| JP | 11120445 | 4/1999 |
| JP | 2000079046 | 3/2000 |
| JP | 2000094838 | 4/2000 |
| JP | 2001203232 | 7/2001 |
| JP | 2001250161 | 9/2001 |
| JP | 2001328663 | 11/2001 |
| JP | 2002360493 | 12/2002 |
| JP | 2003235733 | 8/2003 |
| JP | 2004276964 | 10/2004 |
| JP | 2007257439 | 10/2007 |

(56) References Cited

FOREIGN PATENT DOCUMENTS

| | | |  | |
|---|---|---|---|---|
| JP | 2010516364 | 11/2015 | | |
| KR | 1998040090 | 8/1998 | | |
| KR | 20070004728 | 1/2007 | | |
| NL | 9302219 | 7/1995 | | |
| WO | 8804262 | 6/1988 | | |
| WO | 1998004262 | 6/1988 | | |
| WO | 0160712 | 8/2001 | | |
| WO | 0199047 | 12/2001 | | |
| WO | WO 0199047 A1 | 12/2001 | | |
| WO | 0228241 | 4/2002 | | |
| WO | WO 02/28241 | 4/2002 | | |
| WO | WO 0228241 A1 | 4/2002 | | |
| WO | 0228241 | 11/2002 | | |
| WO | 03039309 | 5/2003 | | |
| WO | 2004065258 | 5/2004 | | |
| WO | 2004065258 | 8/2004 | | |
| WO | 2005044067 | 5/2005 | | |
| WO | 2005044087 | 5/2005 | | |
| WO | WO 2005044067 A1 | 5/2005 | | |
| WO | WO 2005047111 A1 | 5/2005 | | |
| WO | 2005063091 | 7/2005 | | |
| WO | 2005079638 | 9/2005 | | |
| WO | 2007042486 | 4/2007 | | |
| WO | 2007087890 | 8/2007 | | |
| WO | 2007122144 | 11/2007 | | |
| WO | 2008004194 | 1/2008 | | |
| WO | 2008111969 | 9/2008 | | |
| WO | 2008125256 | 10/2008 | | |
| WO | 2008134910 | 11/2008 | | |
| WO | 2008148601 | 12/2008 | | |
| WO | WO-2008148834 A1 | * 12/2008 | ............. | A23F 5/262 |
| WO | 2010099806 | 3/2009 | | |
| WO | WO 2009112291 A1 | 9/2009 | | |
| WO | 2159167 | 3/2010 | | |
| WO | 2010026053 | 3/2010 | | |
| WO | WO 2010/026053 | 3/2010 | | |
| WO | WO 2010026053 A1 | 3/2010 | | |
| WO | 2010034662 | 4/2010 | | |
| WO | 2010041179 | 4/2010 | | |
| WO | WO 2010041179 A1 | 4/2010 | | |
| WO | 2010076761 | 7/2010 | | |
| WO | WO 2010076048 A1 | 7/2010 | | |
| WO | 2011047836 | 4/2011 | | |
| WO | WO 2011047836 A1 | 4/2011 | | |
| WO | 2011060292 | 5/2011 | | |
| WO | 2011141532 | 11/2011 | | |
| WO | WO 2011141532 A1 | 11/2011 | | |
| WO | WO 2012010317 A1 | 1/2012 | | |
| WO | 2013160278 | 10/2013 | | |

OTHER PUBLICATIONS

Non-Final Office Action for U.S. Appl. No. 16/538,752 dated Nov. 8, 2019.
Wikipedia "Binary code"—http://de.wikipedia.org/wiki/binary code—5 pages.
Rosenbaum Oliver, "The Bar Code Dictionary" Cbhv.
Rosenbaum Oliver et al. "Bar-Code" Theory Distionary Software; Verlag Technik Berlin.
Potter Mathias et al, "Barcode Introduction and applications," Verlag Heinz Heise.
Brief Communication for Opposition Proceedings for Appl 15197336.9 dated Mar. 19, 2020.
Oral Letter regarding the opposition Procedure dated Mar. 16, 2020 for EP 3 023 362.
Opposition oral Letter regarding the opposition procedure dated Mar. 16, 2020 for EP 023 362.
Wikipedia defintion of Tiefzihen http://de.wikipedla.org/wiki/Tiefzhiehen.
Wikipedia definition of Stamping https://en.wikipedia.org/wiki/Stamping_(metalworking).
Wikiepedia definition of deep drawing http://en.wikipedia.org/wiki/Deep_drawing.
Regulation No. 1935/2004 of the European Parliament and of the Council of Oct. 27, 2004, Official Journal of the European Union. Annex to the Communication Opposition Appl No. 15 197 336.9.
Brief Communication—Opposition Proceedings for Appl No. 15197336.9 dated Aug. 1, 2020.
Letter regarding Opposition Procedure for Ep Patent No. 3 023 362 dated Dec. 19, 2019.
Brief Communication for Appl No. 15197336.9 dated Oct. 15, 2019.
"Information technology—Automatic indenfification and data capture techniqures—EAN/UPC bar code symbology specification" Second Edition: Dec. 15, 2009.
Letter accompanying subsequently filed items for EP3023362 KRO-44.
Brief Communication—Opposition Proceedings for Appl No. 15197336.9 dated Jul. 23, 2019.
Letter accompanying subsequently filed items for EP3023362 1038-CMS-O.
Brief Communication—Opposition proceedings for Appl No. 15197336.9 dated Jul. 12, 2019.
Opposition Procedure for EP Patent No. EP 3 023 362 dated Jul. 1, 2019.
Miscellaneous requests concerning client data EPO—Jun. 12, 2019.
Letter regarding the Opposition Procedure KRO-44/FWJPL dated Mar. 20, 2019.
Ralf Jesse, "Barcode" Gutachten zur Frage Begriffle, Bitcode/Binacode; Patents EP 3 023 362.
"Information technology—Automatic identifiaction and data capture techniques—Bar code verifier conformance specification—Part 1: Linear symbols" May 20, 2019 10:12.
Information Technology "Automatic idenfication and data capture techniques—Bar code print quality test Specification Linear Symbols" German Version: EN ISO/IEC 15416:2001: Feb. 1998.
Declaration under 37 C.F.R. for U.S. Appl. No. 13/697,297.
Wikipedia "Binarcode" https://de.wikipedia.org/wiki/Binarcode.
Rosenbaum, Jessie, "Bar-Code" Theorie Lexikon Software.
Potter Mathia, "Barcode" Euinfuhrung und Andwendungen.
Oliver Rosenbaum "Das Barcode—Lexicon" edition advanced: cbhv; 1997.
Fairley Michael "Codes and Coding Technology" LCGS, FIP3 and FLOM3: A Labels & Labeling Publication; 2015.
Claims—Amended Claims with annotations-2.
Claims—May 20, 2019 Amended Claims with Annotations.
Auxiliary request during Opposition procedure—May 20, 2019.
Letter regarding opposition procedure for EP 3 023 362 dated Mar. 4, 2019.
Definition of Barcode by Merriam-Webster https://www.merriam-webster.com/dictionary/barcode.
Barcode—Wikitionary "Barcode" https://de.wiktionary.org/wiki/Barcode.
Strichcode—Wikipedia "Strichcode" https://de.wikiepdia.org/wiki/strichcode.
Reply of the patent proprietor to the notice of opposition Feb. 11, 2019; Appl No. 151973366.9.
Notice of Opposition against European Patent No. Ep 3 023 362 dated Jul. 30, 2018.
Notice of opposition to a European patent, Patent No. EP3023362 dated Jul. 25, 2018.
Notice of Opposition to a European Patent Patent No. EP3521209 dated Jan. 22, 2020.
Wikipedia definition of "Barcode".
Regulation (EC) No. 1935/2004 of the European Parliament, and of the Counsel of Oct. 27, 2004; Official Journal of The European Union.
Wikipedia definition of "deep drawing" http://en.wikipedia.org/wiki/Deep_drawing.
Wkipedia Defintion of "Stamping (metalworking)" https://en.wikipedia.org/wiki/Stamping_(metalworking).
Wikipedia definition of "Tiefziehen" https://de.wikipedia.org/wiki/Tiefziehen.
Notice of Opposition: Opposition against European Patent No. 3 521 209 dated Jan. 22, 2020.
Notice of Oppostion to a European Patent for Patent No. EP3521209 dated Jan. 22, 2020.

(56) References Cited

OTHER PUBLICATIONS

Oxford English Dictionary, definition of Foil, [on line] retrieved Jul. 30, 2019. Retrieved from the Internet: URL:<https://www.oed.com/view/Entry/72433>.
ISO/IEC Information technology—Automatic identification and data capture techniques—Bar code verifier conformance specification—ISO/IEC 15426-1:2006(E).
Rosenbaum "Das Barcod-Lexikon" Olas Schlierf Satz, Grafic & DTP: 1997.
Fairley, "Codes and Coding Technology" LCGS, FIP3 and FLOM3; Published 2015.
Rosenbaum "Bar-code" Verlag Tachnik, Theorie, Lexikon, Software; Berlin 2000.
English Translation JPH01233688A.
Wkipedia "Binarcode".
Notice of Opposition for Appl No. 19165223.9 dated Feb. 24, 2020.
English Translation of JP2003235733.
Wkipedia definition of "Deep Drawing" http://en.wikipedia.org/wiki/Deep_Drawing.
Wikipedia definition of "Tiefziehen" http://de.wikipedia.org/wiki/Tiefziehen.
Wikipedia definition of "Stamping (metalworking)" https://en.wikipedia.org/wiki/Stamping_(metalworking).
Notice of Opposition to a European Patent—Patent No. EP3521208 granted Feb. 19, 2020.
Opposition against European Patent No. 3521208—Application No. 19 165 223.9 dated Feb. 19, 2020.
Potter et al, "Barcode" Einfuhrung und Anwendungen; 1993.

\* cited by examiner

CAPSULE, SYSTEM AND METHOD FOR PREPARING A BEVERAGE BY CENTRIFUGATION

CROSS REFERENCE TO RELATED APPLICATIONS

This application is a continuation of U.S. application Ser. No. 13/697,297 filed Nov. 9, 2012, which is a National Stage of International Application No. PCT/EP2011/057657 filed May 12, 2011, which claims priority to European Patent Application No. 10169374.5 filed Jul. 13, 2010 and European Patent Application No. 10162741.2 filed May 12, 2010, the entire contents of which are incorporated herein by reference.

INTRODUCTION

The invention relates to the preparation of a beverage by use of a capsule containing beverage ingredient in a beverage production device. The present invention in particular focuses on the detection of the capsule.

BACKGROUND ART

The preparation of a beverage by a capsule containing beverage ingredient is known. In general, the capsule is inserted in a beverage production device, such as a coffee machine, liquid is fed in the capsule and a beverage is extracted from the capsule under pressure or by gravity.

The preparation of a beverage by using the centrifugation is known. The principle mainly consists in providing beverage ingredient in a container of the capsule, feeding liquid in the receptacle and rotating the receptacle at elevated speed to ensure interaction of liquid with powder while creating a gradient of pressure of liquid in the receptacle; such pressure increasing gradually from the centre towards the periphery of the receptacle. As liquid traverses the coffee bed, extraction of the coffee compounds takes place and a liquid extract is obtained that flows out at the periphery of the receptacle.

The term "capsule" refers to any flexible, rigid or semi-rigid container containing beverage ingredient. Other synonymous to a capsule are: "pod", "pad", "cartridge" or "sachet". The capsule can be single use. The container can also be filled with ingredient by the user to form the capsule just before use.

The term ingredient means any suitable beverage substance such as ground coffee, soluble coffee, leaf tea, soluble tea, herbal tea, dairy powder, baby food, culinary powder and combination thereof.

The invention relates more particularly to the identification of the capsule by means of a code. The code may be necessary to control parameters in the beverage preparation device such as liquid or beverage flow rate, pressure, rotational speed, temperature and combinations thereof.

EP0451980 relates to packages containing comestibles for the preparation of beverages. Recognition means can comprise one or more strips of a magnetic material applied to the body of the package which can be read by an appropriate magnetic sensor, one or more shaped or divided areas of metal foil applied to the package body which cause an inductive effect on movement of the package in the machine, which inductive effect can be sensed; or one or more electrically conductive areas formed on the body of the package which can be sensed electrically.

WO02/28241 relates to an encoded coffee packet for use in the preparation of hot or cold beverages comprising a filter defining a cavity and a brewing ingredient within the cavity. The packet further comprises a machine-interpretable feature located on the filter such as a color, a shape, a glyph, a text string, a barcode or a digital watermark.

WO02/078498 relates to a machine-readable identifier on a portion package which contains ground coffee for espresso machine. The identifier can be a concentric barcode which is read when the capsule turns around an axis which is placed outside of its perimeter such as when the capsule is stored in a carousel.

WO2005044067 relates to a system for identifying a capsule having a code visible under UV light printed thereon or a magnetic code such as a ribbon or label. The code may be read by a turning magnetic reading head. However, such system is not adapted for detecting a capsule in a device using centrifugal forces for extracting the beverage.

WO2009007292 relates to a method for reading barcodes in a drinks machine when the brewing chamber is being closed from an open position to a closed position.

WO2010/026053 relates to a controlled beverage production device using centrifugal forces. The capsule may comprise a barcode provided on an outside face of the capsule and which enables a detection of the type of capsule and/or the nature of ingredients provided within the capsule in order to apply a predefined extraction profile for the beverage to be prepared.

A problem with identifying a capsule in a beverage preparation machine is that the retrieving or reading information from the capsule is not always reliable or convenient. The present invention brings a solution to this problem.

BRIEF DESCRIPTION OF THE INVENTION

The aim of the present invention is to propose an improved way to identify the capsule within a beverage production machine to ensure a more reliable and convenient retrieval or reading of information so as to adjust working parameters of the machine.

This aim is achieved by a capsule for the preparation of a beverage comprising a container and a beverage ingredient contained therein, wherein the container comprises a code adapted for being identified or read by external reading means, wherein the code is arranged on the container to be read while the capsule is rotated around an axis of rotation traversing the capsule.

More particularly, the capsule has a circumference wherein the code is arranged on the container along an arc-shaped or circular path of the circumference. In a particular mode, the capsule has a circumference wherein the code comprises successive segments which are individually rectilinear but extend substantially along at least a part of the circumference. More particularly, the code is arranged along at least a eighth of the circumference. This configuration provides a reliable reading or retrieval of information as well as an effective portion for information. In order to ensure a reliable reading or retrieval of information, the code is repeated along said circumference. The repetition ensures a higher probability that at least one code is readable but also may potentially reduce the reading time.

Preferably, the code is an optical code. The code may be a bit code formed by a series of discrete polygonal (e.g., rectangles or squares) or dot surfaces printed on the container and/or embossed in the container.

The code may printed by a visible ink by human eyes under natural light or, alternatively, an ink which is not visible by human eyes under natural light (e.g., ink visible under UV).

Preferably, the code is printed or embossed to form a pattern which possesses surfaces having different reflective and/or absorbing properties to light. In particular, the pattern possesses first surfaces and second surfaces having different reflective and/or absorbing properties to light. More particularly, the pattern possesses first surfaces inclined mirroring or absorbing properties to light and second surfaces having flat mirroring or flat reflective properties to light.

In a possible mode, the code is mechanically embossed or engraved on the container by laser or by other means such as a press.

In an embodiment, the container comprises a body and a lid connected to the body and wherein the code is present on the lid of the container. The lid may be a closed foil and/or a filter, for example.

In another embodiment, the code is present on the rim of the capsule. In the most preferred embodiment, the code is present on the bottom of the rim of the capsule which is opposed to the lid of the capsule. The bottom of the rim is sufficiently away from the liquid injection and beverage delivery areas so that there is a lower risk for the code to become unreadable such if partly or totally hidden or soiled by beverage residues or otherwise (e.g., coffee particles). As a result, the reading is made more reliable. The reading may also be carried out while the capsule is in place in the beverage production device. Therefore, the preparation of the beverage is simplified and the preparation time can be reduced.

The invention further relates to a system for preparing a beverage from a capsule as aforementioned and further comprising a beverage preparation device; wherein the device comprises capsule holding means for holding the capsule and rotational drive means for driving the holding means and capsule in rotation along said axis of rotation and reading means arranged for reading the code when the capsule is rotated along said axis.

In particular, the reading means may comprise a light emitter and a light sensor. In an alternative, the reading means comprises an inductive sensor. The optical reading means or inductive sensor may be arranged to detect a code on the rim of the capsule.

The invention further relates to a method for preparing a beverage from a system comprising a capsule as aforementioned and a beverage preparation device; wherein the device comprises capsule holding means for holding the capsule therein and rotational drive means for driving the holding means and capsule in rotation along said axis of rotation and reading means arranged for reading the code when the capsule is rotated along said axis.

The invention is further described in the appended claims and the following detailed description.

BRIEF DESCRIPTION OF THE FIGURES

The present invention will be better understood thanks to the detailed description which follows and the accompanying drawings, which are given as non-limiting examples of embodiments of the invention, namely.

DETAILED DESCRIPTION

Figure 1:
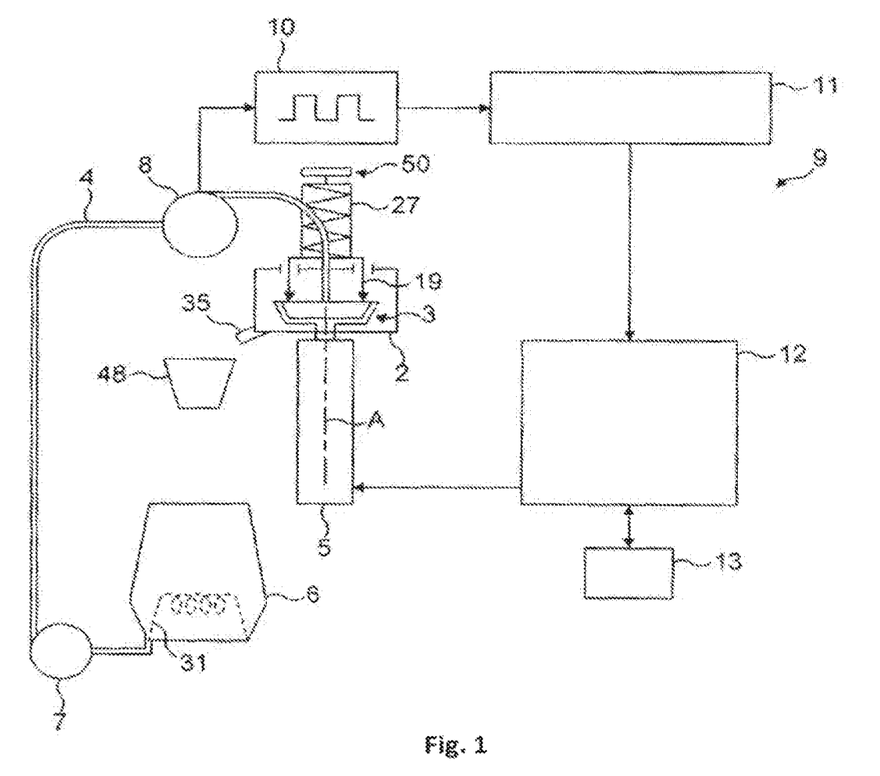
FIG. 1 illustrates the basic principle of the centrifugal extraction.

FIG. 1 illustrates an example of a beverage preparation system 1 as described in WO2010/026053 for which the capsule of the invention can be used.

The centrifugal unit 2 comprises a centrifugal cell 3. The cell 3 may comprise a capsule holder and a capsule received therein. The centrifugal unit is connected to driving means 5 such as a rotary motor. The centrifugal unit comprises a collecting part and an outlet 35. A receptacle 48 can be disposed below the outlet to collect the extracted beverage. The system further comprises liquid supply means such as a water reservoir 6 and a fluid circuit 4. Heating means 31 may also be provided in the reservoir or along the fluid circuit. The liquid supply means may further comprise a pump 7 connected to the reservoir. A flow restriction means 19 is provided to create a restriction to the flow of the centrifuged liquid which leaves the capsule. The system may further comprise a flow meter such as a flow-metering turbine 8 for providing a control of the flow rate of water supplied in the cell 3. The counter 11 can be connected to the flow-metering turbine 8 to enable an analysis of the generated impulse data 10. The analysed data is then transferred to the processor 12. Accordingly, the exact actual flow rate of the liquid within the fluid circuit 4 can be calculated in real-time. A user interface 13 may be provided to allow the user to input information that is transmitted to the control unit 9. Further characteristics of the system can be found in WO2010/026053.

In the following examples (see FIG. 4), the capsule comprises a cup-shaped body 69 extending by a flange-like rim 73. A lid such as a foil or membrane (liquid-tight or permeable to liquid) 60 is connected to the body, e.g., sealed on the rim. The body 69 extends from a bottom end of the body 69 to a top end of the body 69 where the body 69 terminates such that a height of the body 69 is the distance from the bottom end to the top end, the flange-like rim 73 extends from the top end of the body 69, and the lid 60 has a height that is less than the height of the body 69. The capsule is filled with beverage ingredient such as ground coffee.

The capsule is designed for rotating around an axis A. This axis A crosses perpendicularly the center of the membrane which has the form of a disk. This axis A exits at the center of the bottom of the body. This axis A will help to define the notion of "circumference" which is a circular path located on the capsule and having the axis A as reference axis. This circumference can be on the lid, e.g., membrane or on the body part such as on the flange-like rim. The lid may be impervious to liquid before insertion in the device or it may be pervious to liquid by means of small openings or pores provided in the center and/or periphery of the lid. The code is spread along the circumference or a part of the circumference. The code may comprise successive archshaped segments. The code may also comprise successive segments which are individually rectilinear but extend along at least a part of the circumference.

According to one embodiment, the sensor cannot read the code without the rotation of the capsule. This is the case where the code is spread along at least a eighth, preferably at least a quarter of the circumference or even more. The fact that the code is placed along an arc-shaped line render the reading by a sweep beam very difficult. This is why the rotation of the capsule plays an important role. In case that the code is located on the body, it is then necessary to rotate the capsule to have access, for the sensor, to the entire set of marks composing the code. The code is further located close to the peripheral edge of the capsule. The peripheral edge is defined as the outermost circular line of the capsule. Preferably, the distance of the code from the peripheral edge is not more than 10 mm, more preferably not more than 8 mm.

According to an embodiment, the code is printed by an ink which is not visible by human eyes under natural light (e.g., ink visible under UV). In this case, the sensor further comprises a UV-light beam source and a UV detector.

The code is preferably repeated along the circumference in order to ensure a reliable reading. The code is repeated at least twice on the circumference. Preferably, the code is repeated three to six times on the circumference. Repetition of the code means that the same code is duplicated and the successive codes are positioned in series along the circumference so that upon a 360-degree rotation of the capsule, the same code can be detected or read more than one time.

EXAMPLES

Figure 2:
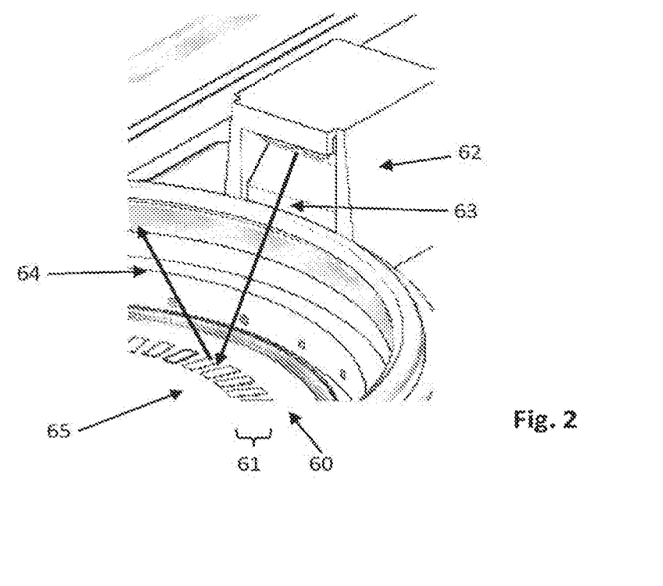
FIG. 2 illustrates the reading method of a mark on the lid surface of the capsule.
Figure 3:
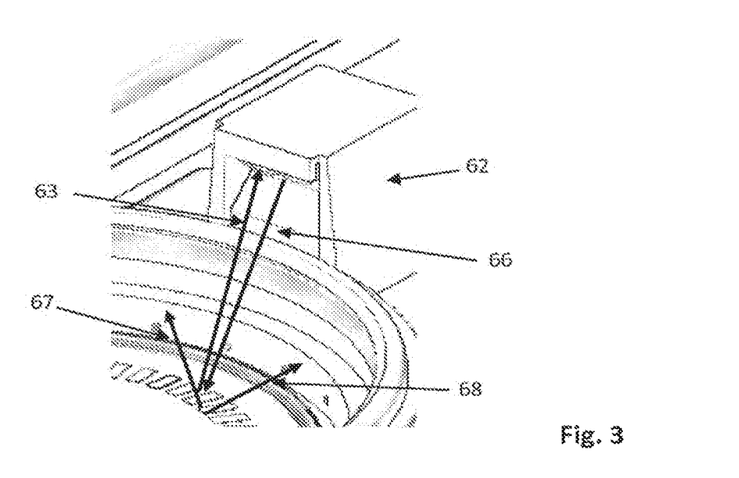
FIG. 3 illustrates the reading method of an absence of the mark.

1) Optical Reading on Foil, Respectively on Top Side Rim of Capsule (FIGS. 2 and 3):

A light beam is projected onto the capsule's lid, e.g., membrane or foil 60, as illustrated on FIG. 2.

Onto the capsule foil 60, a plurality of bits forming the code 61 is applied along a circular or arc-shaped path.

Preferably, the code is placed on a flat portion of the lid and close to the peripheral edge of the capsule. The code is preferably placed the lid that is supported by the flange-like rim of the capsule or overlaps with the rim. Hence, the code is not distorted due to mechanical constraints and can be read more reliably.

The marks may consist of:
Mirroring or absorbing surfaces for providing bit "0" and,
Diffusing and reflective surfaces for providing bit "1"
The binary values "0" and "1" are arbitrary chosen and can be inversed.

The code is read by rotating the capsule along a central axis A (FIG. 1).

The reader or sensor 62 is part of the centrifugal unit 2 and consists of
A light source with or without focusing optic and
A light sensor with or without focusing optic.
The light can be:
Non polarized or
Polarized (laser) or
Spectrum: Any, but preferably infra red.
The code can be applied on the capsule by:
Printing (absorbing/reflecting+diffusing), visible, invisible or
Embossing (mirroring+rough reflecting+diffusing) or
Laser engraving.

Optionally, the bit code may also consist of different color patterns combined with a color reading device. The combination of different colors and reading at a specific rotational speed results in a well defined "mixed color". As an example, a capsule with half the circumference in blue and the other half in yellow would result in reading a green color during rotation. In the same manner, one third in blue and the remaining part in yellow will give another color. In this case, the light could be a simple light source without specific convergence means.

As illustrated in FIG. 2, when the light beam 63, sent by the light source of the sensor 62, touches the mirror code pattern (small rectangles 65) it reflects in a reflective beam 64 which is not received by the sensor.

As the capsule is rotated (FIG. 3), the light beam 63 touches a diffuse reflecting surface (surface between the small rectangles) and is partially reflected to the sensor. A reflective beam 66 is received by the sensor whereas other beams 67, 68 are diffused or reflected outside the sensor.

Figure 4:
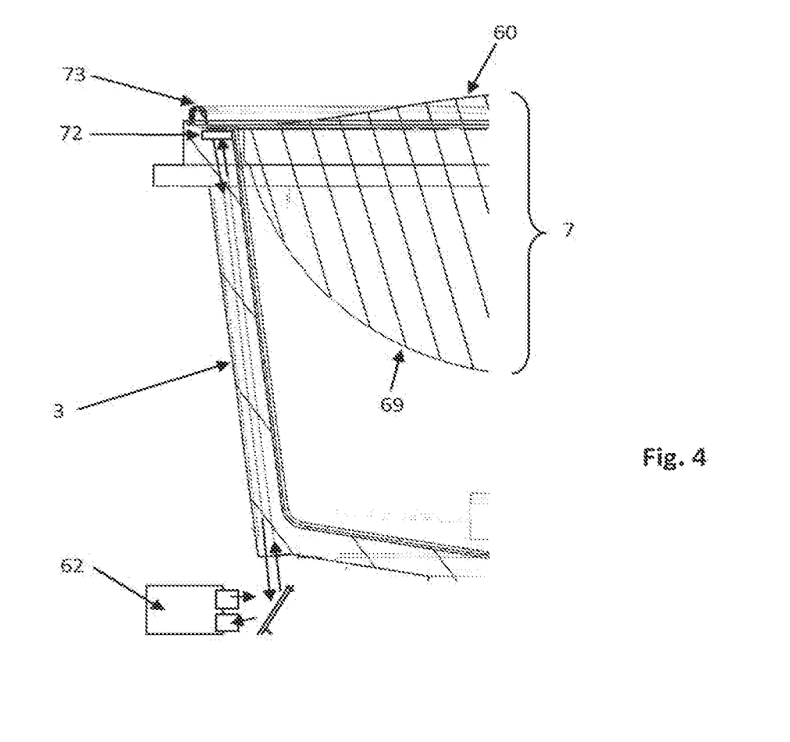
FIG. 4 illustrates an alternate position of the code on the capsule, in particular, when placed on the underside of the rim of the capsule, and the capsule fitted into a capsule holder of the extraction device.

2) Optical Reading on Rim Bottom Side of Capsule (FIGS. 4 to 7):

The capsule 7 may comprise a code 70 on the bottom side 72 of its rim 73. The bit code is formed of a succession of small rectangular surfaces having light mirroring properties and intermediate surfaces having flat mirroring and/or diffusing properties. The surfaces are arranged in a circular pattern or an arc-shaped pattern at least along an angular portion of the rim.

A light beam 74 is projected to the capsule's rim 73.

Onto the capsule rim, a bit code is applied along a circular or arc-shaped path of the rim.

The bit code may consist of:
Inclined mirroring or (flat) absorbing surfaces for bit "0" and
Flat mirroring or flat reflective (diffusing) surfaces for bit "1"

The bit code is read by rotating the capsule along its central axis A.

The reader may consist of
A light source with/without focusing optic and,
A light sensor with/without focusing optic.
The light can be:
Non polarized or
Polarized (laser) or
Spectrum: Any, but preferably infra red.
The code can be applied on the capsule by:
Printing (absorbing/reflecting+diffusing), visible, invisible or,
Laser engraving (e.g. for absorbing/reflecting-diffusing) surfaces or,
Embossing: Flat and inclined mirroring surfaces.

In the embodiment of the FIG. 4, the light source is placed at the bottom of the centrifugal cell 3. This cell is light conductive allowing the beam to reach the bottom side 72 of its rim 73. The reflected light is conducted by the transparent (or light conductive) centrifugal cell 3 to reach the sensor 62. In case that the sensor 62 cannot be aligned with the transparent part of the centrifugal cell 3, a mirror can be placed as illustrated in the FIG. 4 to deflect the forward and backward beams.

Figure 5:
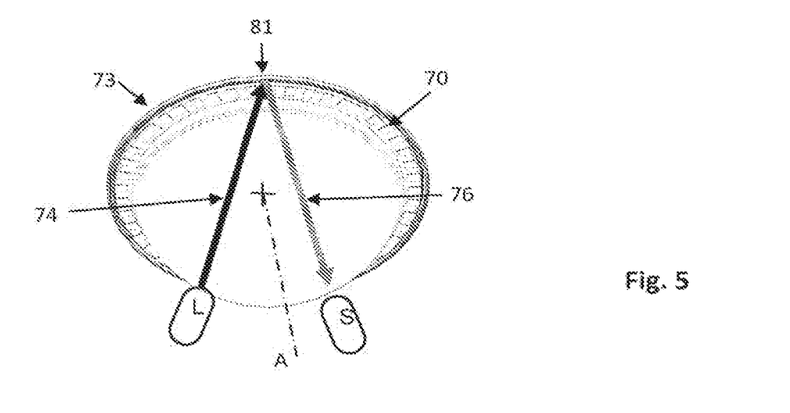
FIGS. 5 and 6 illustrate the combination of a laser source and a detector in positive and negative detection, for example, for the alternate position of the code of FIG. 4.

On FIG. 5, the light beam 74 from the light source "L" touches the mirror surface of the code (small rectangle 81) and is reflected into a reflective beam 76 to the sensor "S" with high intensity. A bit such as "0" or "1" is thereby provided to the control unit.

Figure 6:
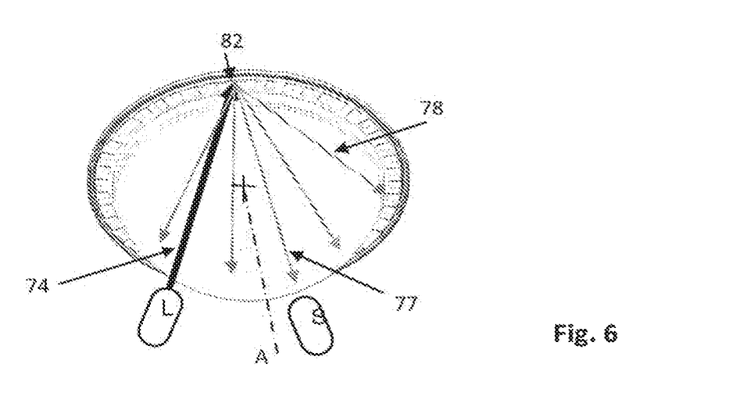
Figure 7:
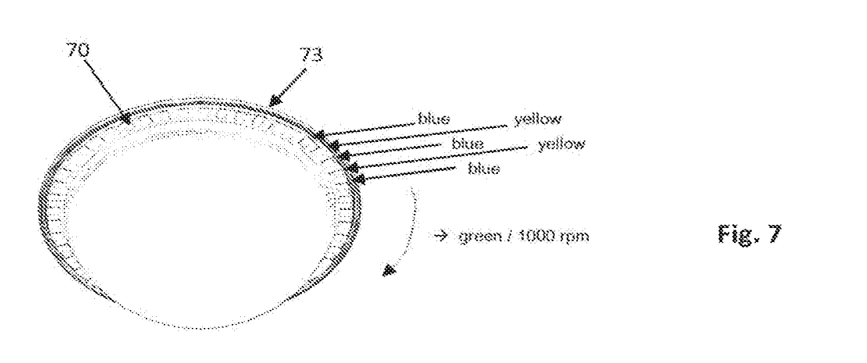
FIG. 7 illustrates the detection of a color code on the capsule, for example, for the alternate position of the code of FIG. 4.

On FIG. 6, the light beam 74 from the light source "L" touches diffusing or absorbing surfaces (surface 82 between two small rectangles). The light beam 77 that reaches the sensor S is of small intensity. Other beams such as beam 78 are diffused outside the sensor S due to the diffusing properties of the surface.

In each configuration (e.g., FIGS. 5-6), a bit such as "1" or "0" is provided to the control unit.

Therefore, the number of bits and their bit code depend on the number and specific arrangement of mirror surfaces (e.g. rectangles) and diffusing or absorbing surfaces (e.g., zones between the rectangles). The same sequence of bits forming a "code" can be repeated several times on the circumference of the rim. This repetition provides redundancy and more reliability to the reading.

Optionally (FIG. 7), the code comprises different color patterns combined with a color reading device. The combination of different colors and reading at a specific rotational speed results in a well defined "mixed color". As an example, a capsule with half the "dots" in blue and the other half in yellow would result in reading a green color during rotation.

3) Application Modes of Codes onto a Capsule

The codes described in the previous examples can be applied by different methods onto a capsule such as by:
Printing or mechanical deforming on a formed capsule or,
Printing or mechanical deforming on the capsule raw material (foil) before container forming or,
Printing on outer surface of a capsule container or,
Printing on the inner surface of a capsule container, using the curl as information support (Aluminum capsule technology).

4) Inductive Code Reading:

Another mode consists in sensing a code provided on a metallic surface of the capsule using an inductive sensor. The code is formed by reliefs or recesses in the metallic surface. For instance, the capsule comprises a circumferential metal rim which comprises a succession of discrete slots and/or bumps. When the capsule is rotated about its central axis, the rim is moved relative to the sensor such that the slots and/or bumps are detected. The code can be read on a time base of a CPU of the beverage preparation device. The maximum rotational speed to read the code depends on the used sensor and the internal CPU of the device.

5) Other General Characteristics to All Embodiments:

The speed for reading can, for instance, be comprised between 0.1 and 1000 rpm.

When reading the code, liquid can already be fed in the capsule for providing a pre-wetting of the beverage ingredients.

The code preferably comprises three sections, the synchronization section, the payload section and the verification section. The synchronization section serves for the synchronization purpose i.e. to inform the sensor when the code begins. Since the speed of the rotation of the capsule can vary, the synchronization is achieved through a known sequence of bits such as 0,1,0,1. Then the payload of the code identifying the capsule can be read. In order to avoid misinterpretation of the code, the payload can be followed by verification bits. These bits can be a checksum on the payload or a similar verification function.

The code can be replicated along the code path so that if one code gives a wrong verification value, the other code(s) can be taken into account.

The invention claimed is:

1. A capsule for preparation of a beverage, the capsule comprising a container and a beverage ingredient contained therein, the container comprises a code adapted for being identified or read by an external reader, the code is arranged on the container to be read while the capsule is rotated around an axis of rotation traversing the capsule,
the container comprises a body and a lid connected to the body, the body comprising a rim, and
the code is repeated along a circumference of the container and is present on a bottom of the rim of the capsule which is opposed to the lid of the capsule.

2. The capsule according to claim 1, wherein the code is arranged on the container along an arc-shaped or circular path of the circumference of the container.

3. The capsule according to claim 1, wherein the code comprises successive segments which are individually rectilinear but extend substantially along at least a part of the circumference of the container.

4. The capsule according to claim 1, wherein the code is arranged along at least an eighth of the circumference of the container.

5. The capsule according to claim 1, wherein the code is a bit code comprising a series of discrete polygonal or dot surfaces printed on and/or embossed in the container.

6. The capsule according to claim 1, wherein the code is printed by an ink which is not visible by the human eye under natural light.

7. The capsule according to claim 1, wherein the code is printed or embossed by a pattern which possesses surfaces having different reflective and/or absorbing properties to light.

8. The capsule according to claim 7, wherein the pattern possesses a first surface having inclined mirroring or absorbing properties to light and a second surface having flat mirroring or flat reflective properties to light.

9. The capsule according to claim 1, wherein the code is mechanically embossed or engraved on the container by a laser.

10. A system for preparing a beverage from a capsule comprising a container and a beverage ingredient contained therein, the container comprises a code adapted for being identified or read by an external reader, the code is arranged on the container to be read while the capsule is rotated around an axis of rotation traversing the capsule, and the system further comprising a beverage preparation device that comprises a capsule holder for holding the capsule, and the beverage preparation device comprises a rotational driver for driving the holder and the capsule in rotation along the axis of rotation, and the beverage preparation device comprises the reader arranged for reading the code when the capsule is rotated along the axis,
the container comprises a body and a lid connected to the body, the body comprising a rim, and
the code is repeated along a circumference of the container and is present on a bottom of the rim of the capsule which is opposed to the lid of the capsule.

11. The system according to claim 10, wherein the reader comprises a light emitter and a light sensor or an inductive sensor.

12. The system according to claim 10, wherein the optical reader or inductive sensor is arranged to detect a code on the rim of the capsule.

13. A method for preparing a beverage from a system comprising a capsule comprising a container and a beverage ingredient contained therein, the container comprises a code adapted for being identified or read by an external reader, the method comprising rotating the container and reading the code while the capsule is rotated around an axis of rotation traversing the capsule, and the system further comprises a beverage preparation device, the beverage preparation device comprises a capsule holder for holding the capsule, and the beverage preparation device comprises a rotational driver for driving the holder and the capsule in rotation along the axis of rotation, and the beverage preparation device comprises the reader arranged for reading the code when the capsule is rotated along the axis, and extracting the beverage from the capsule by rotating the capsule along the axis,
- the container comprises a body and a lid connected to the body, the body comprising a rim, and
- the code is repeated along a circumference of the container and is present on a bottom of the rim of the capsule which is opposed to the lid of the capsule.

14. The method according to claim 13, wherein the code is read at a first rotational speed, and the beverage is extracted from the capsule at a second rotational speed.

* * * * *